Patented Aug. 23, 1932

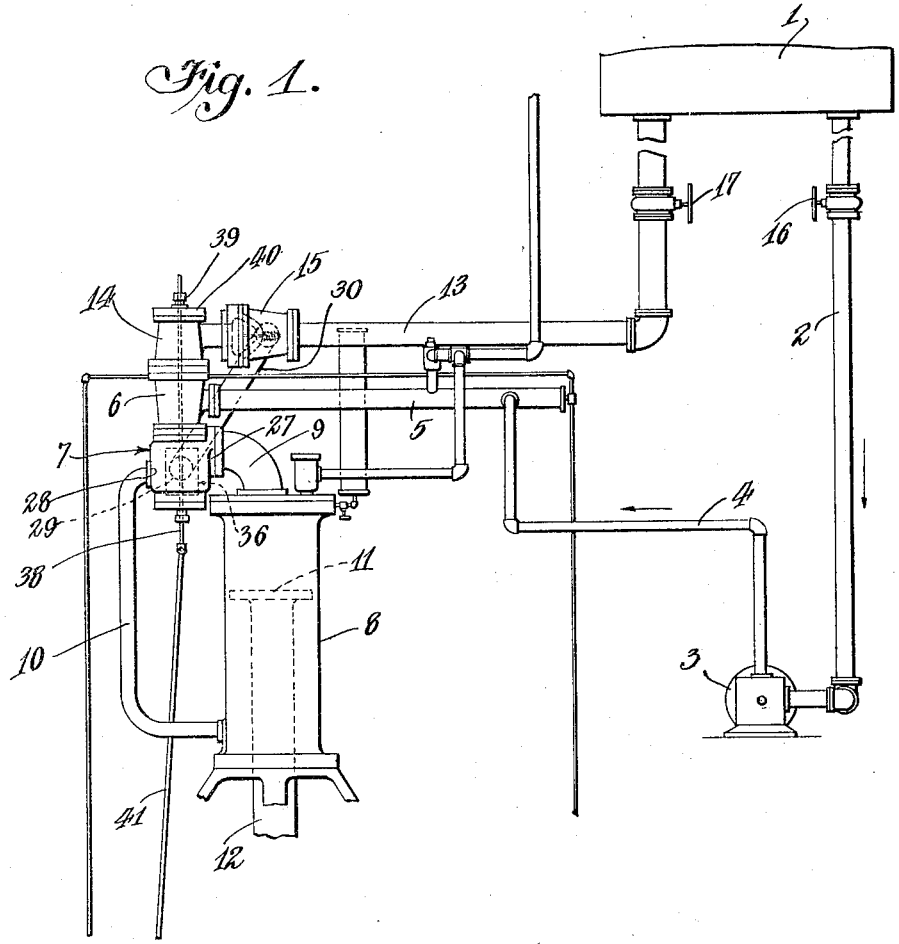

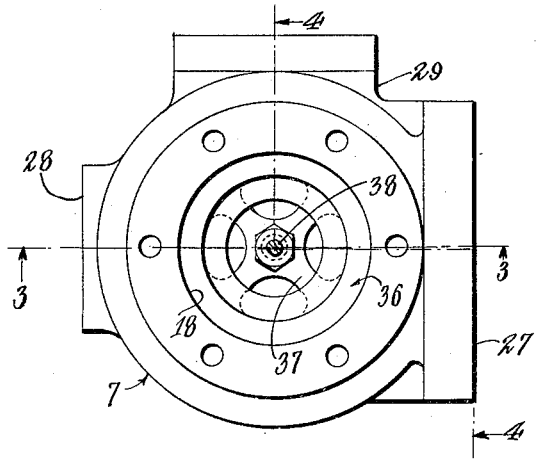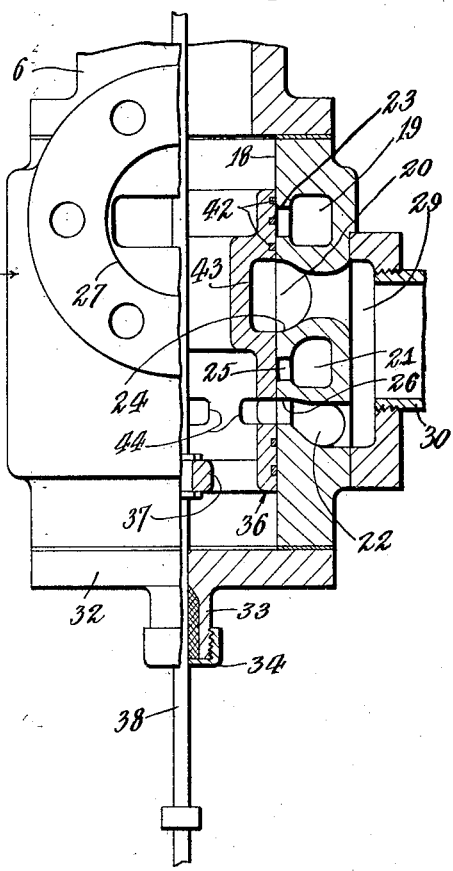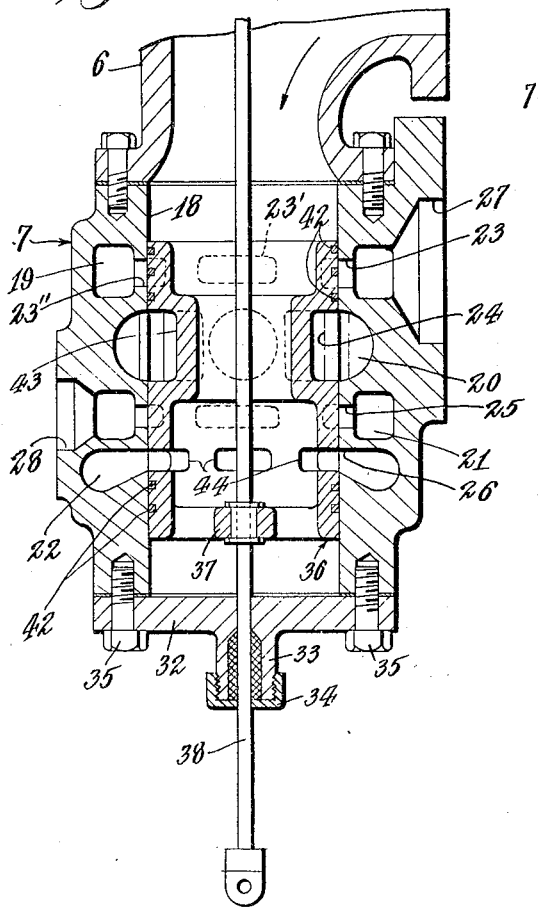

1,873,446

UNITED STATES PATENT OFFICE

WILLIAM McCLINTOCK AND FRANK Y. PEARNE, OF LOS ANGELES, CALIFORNIA, ASSIGNORS TO PACIFIC CLAY PRODUCTS, OF LOS ANGELES, CALIFORNIA, A CORPORATION OF CALIFORNIA

BALANCED VALVE ASSEMBLY

Application filed February 4, 1930. Serial No. 425,824.

This invention relates to a balanced throttle valve, particularly adapted for use in liquid pressure systems, and to an assembly of parts whereby a fluid pressure system is obtained capable of being controlled with great flexibility, rapidity and ease.

Heretofore fluid pressure systems (wherein fluid pressure is used to produce linear or reciprocating motion of any desired mechanism) could not be readily controlled without the use of pressure accumulators, and even then it was substantially impossible to produce a rapid movement of the piston in the pressure cylinder, in view of the fact that the pressure on the liquid would quickly drop and have to be built up again by the pump before the piston in the pressure cylinder would again move.

The assembly embraced by this invention, however, employs not only fluid under pressure such as is generated by a pump, but in addition employs a hydrostatic head of pressure which comes into play when the pressure on the liquid as produced by the pump drops below the hydrostatic head pressure.

Furthermore, an object of this invention is to disclose and provide a balanced throttle valve capable of quickly reversing the direction of the pressure fluid without producing an undesirable shock to the system.

Another object of this invention is to disclose and provide a valve assembly which is extremely compact and fool-proof.

Another object of this invention is to disclose and provide a valve assembly by means of which either end of a pressure cylinder may be connected to a source of fluid pressure, while the other end of the pressure cylinder is connected to a discharge port.

Another object of this invention is to disclose and provide a valve assembly which effectively seals the ports leading to opposite ends of the pressure cylinder when the valve is in neutral position, thereby substantially preventing any movement from taking place in the pressure cylinder while the pressure fluid is by-passed through the valve.

Another object is to disclose and provide a control valve for liquid pressure systems in which the slide mechanism is uniformly subjected to pressure at all times, and for this reason is not subject to unequal stresses or strains.

Other objects, uses and advantages of this invention will become apparent from the following detailed description of one preferred form of the apparatus.

In describing the invention, reference will be had to the appended drawings, in which:

Fig. 1 is a diagrammatic representation of a general valve assembly as applied to a pressure cylinder.

Fig. 2 is a plan view of the balanced valve employed in the assembly shown in Fig. 1.

Fig. 3 is a longitudinal section through the valve, said section being taken along the plane 3—3 of Fig. 2; and Fig. 4 is a side elevation, partly in longitudinal section, the view being taken along the plane 4—4 of Fig. 2.

As shown in Fig. 1, the pressure system may include a reservoir 1 for a suitable fluid such as oil, connected by a line 2 with the inlet of a pressure pump 3 of any suitable design. The pump 3 may discharge through a line 4 and a line 5 into a T-connection 6 from which the pressure fluid is supplied to a balanced throttle valve 7.

The valve 7 may be provided with ports in communication with opposite ends of a pressure cylinder 8, fluid being conveyed to opposite ends of said pressure cylinder 8 by pipe means 9 and 10 from separate ports of the valve 7. The pressure cylinder 8 preferably contains a piston 11 carried by a rod 12, said rod 12 being connected to the mechanism which it is desired to operate by means of the pressure cylinder 8. By reason of rod 12, a difference in surface area exists between the upper and lower surfaces of the piston 11.

The T 6 may also be in communication with the reservoir 1, as by pipe means 13 and a T 14. Preferably, a check valve 15 is positioned in the line 13, said check valve being adapted to open only when the pressure in the T 14 or the T 6 or valve 7 drops below the hydrostatic head or gravitational pressure of the fluid in line 13 from the tank 1. In other words, the tank 1 is preferably positioned above the check valve 15 and throttle valve 7. Valves 16 and 17 may be positioned in the lines 2 and 13 so as to permit the supply of fluid from the reservoir 1 to be shut-off when the apparatus is being repaired.

The throttle valve may comprise a body portion 7 provided with an axial bore 18. The body portion 7 is also preferably provided with a plurality of annular channels spaced longitudinally of the bore and in communication with said bore. As shown in Figs. 3 and 4, the body portion 7 is preferably provided with four annular longitudinally spaced channels, namely, channels 19, 20, 21 and 22.

The annular chambers 19, 20, 21 and 22 are preferably in communication with the bore 18 of the body portion 7 by means of ports, such as for example, the ports 23, 24, 25 and 26. Said ports 23, 24, 25 and 26 are preferably not completely circular, but instead may be separated by webs so as to provide a plurality of ports extending transversely of the bore 18, such as for example, the ports 23, 23' and 23''.

Two of the annular chambers are preferably in communication with opposed ends of the pressure cylinder 8, and such chambers are preferably spaced from each other. For example, the annular chamber 19 may communicate with a port 27, which in turn is connected to the pipe line 9 leading to the top of pressure cylinder 8, whereas the chamber 21 once removed from the annular chamber 19, may be in communication with a port 28 by means of which fluid may be discharged into line 10 leading to the bottom of the pressure cylinder 8.

The channels 20 and 22 are preferably connected with a zone of fluid pressure which is normally lower than the fluid pressure in lines 4 and 5. These channels 20 and 22 may connect with the reservoir 1 and may connect to a common chamber 29 which discharges into a line 30 leading into line 13, or as shown in Fig. 1, into the T 15 which contains the check valve. It is to be understood that the line 30, however, enters the tee 15 at a point between the reservoir 1 and the check valve, thereby permitting the channels 20 and 22 to discharge into the reservoir 1.

The body portion 7 may be provided with a closure member 32 adapted to effectively close one end of the bore 18. Said closure member may comprise a plate provided with a stuffing box 33 and a gland 34, said closure member 32 being attached to the body portion of the valve as by means of the threaded bolts 35.

A cylindrical slide valve 36 is slidably positioned within the bore 18, said slide valve 36 being provided with a ported spider 37 connected to an actuating rod 38 which extends through the stuffing box 33 and the closure member 32. The upper portion of the rod 38 may extend through the T's 6 and 14 and pass through a suitable packing gland 39 carried by a closure member 40 attached to the T 14. The slide valve 36 may, therefore, by the manipulation of the rod 38 or the link 41 attached thereto, be moved within the bore 18 of the throttle valve.

The slide valve 36 is preferably provided with expansion rings, such as the rings 42, so as to prevent the passage of fluid therebetween. Furthermore, the slide valve 36 may be provided with an annular chamber 43, said chamber being of sufficient width to permit fluid to pass therethrough from one of the said channels, say channel 20, into another adjoining channel such as channel 21, when the slide valve 36 is in proper position.

The slide valve 36 may also be provided with a plurality of ports in circumferential alinement, such as for example, the ports 44, said ports being adapted to communicate with say, ports 26 when the annular channel 43 is in alinement with the ports 24 leading to the body channel 20.

In actual operation, fluid under pressure is supplied by the pump 3 from the reservoir 1 into the bore 18 of the valve 7, as by means of the T 6. When the valve is in neutral position, as shown in Figs. 3 and 4, said pressure fluid will be discharged from the valve through the ports 44 into the annular chamber 22. From said chamber 22, the fluid may pass through conduit 29 into the line 30 and be thus returned by line 13 to the tank 1. It is to be understood that valves 16 and 17 are open. It will thus be seen that the slide valve 36 is exposed to fluid pressure not only internally but also externally, as the pressure fluid fills the annular chamber or channel 20 and the annular chamber 43 of the slide valve 36.

Under these conditions, therefore, very little effort need be exerted in order to move the slide valve 36 by operation of the rod 38. If the rod 38 were to be moved upwardly, then the admission of pressure fluid through the ports 44 into the channel 22 would cease, and instead the pressure fluid would be discharged through the ports 44 into the ports 25, which lead to the annular chamber 21.

Said annular chamber 21 is in communication with the port 28 which in turn is connected with line 10 leading to the bottom of cylinder 8. Pressure fluid will thus be admitted to the bottom of cylinder 8 and cause the piston 11 to rise. Simultaneously, the liquid in the upper portion of cylinder 8 will be discharged through the line 9 and through the port 27 into the annular chamber 19 of the valve 7, from whence it may pass through the ports 23 into the annular chamber 43 of the slide valve 36, said annular chamber 43 being now in communication with said ports 23 and with the ports 24 of the annular channel 20.

Whenever the pressure fluid from line 5 commences to pass through ports 23 or 25 from the bore 18, and the pressure of the fluid within the bore 18 drops because of said opening of the ports 23 or 25, then the fluid from the tank 1 is supplied to the bore 18 through the check valve 15. This supply of fluid under hydrostatic head from the tank 1 comes into effect only when the pressure of the fluid in the bore 18 decreases to a point below the hydrostatic fluid pressure from the tank 1. This is of particular importance when it is desired to rapidly advance the piston 11 in the pressure cylinder 8 downwardly, the conjoint action of the weight of the piston 11 and rod 12 and the difference in surface area between upper and lower piston surfaces momentarily permitting the use of a large volume of liquid under pressure. As the pump 3 may be of a relatively low capacity (capable of building up a high pressure but only at slow rates of flow), an opportunity occurs for the use of the high head of liquid from the reservoir 1.

It will thus be seen that a simple valve structure has been provided which is capable of readily controlling the movements of a pressure cylinder and in which pressure fluid may be employed directly from a feed pump and without the use of a pressure accumulator between the pump and the valve. It is to be understood, however, that a pressure accumulator may be employed in a system such as has been described hereinabove, if desired.

Furthermore, the invention is not limited to the precise construction and arrangement of elements shown in the appended illustrative drawings, but may be materially modified without departing from the scope of the invention defined in the appended claims.

We claim:

1. A balanced valve assembly for use in liquid pressure systems, comprising a body portion, an axial bore in said body portion, means for effectively closing one end of said bore, four annular channels formed in said body portion and spaced longitudinally of said bore, ports leading from each of said annular channels to said bore, a common outlet for two of said channels, separate ports leading to the other channels and adapted to conduct fluid to opposed ends of a pressure cylinder, a port for pressure fluid leading to said bore, a cylindrical slide valve slidably positioned in said bore, an actuating rod connected to said slide valve and extending from said body portion, a single annular channel in the outer face of said slide valve, said annular chamber being adapted to form a conduit between adjoining longitudinally spaced ports communicating with the bore of said body portion, and a plurality of ports in circumferential alinement in said slide valve.

2. A balanced valve assembly for use in liquid pressure systems, comprising a body portion, an axial bore in said body portion, means for effectively closing one end of said bore, four annular channels formed in said body portion and spaced longitudinally of said bore, ports leading from each of said annular channels to said bore, a common outlet for two of said channels, separate ports leading to the other channels and adapted to conduct fluid to opposed ends of a pressure cylinder, means for admitting pressure fluid to the open end of said bore, separate pipe means for admitting fluid under gravity head into the open end of said bore, a check valve positioned in said separate pipe means, a cylindrical slide valve slidably positioned in said bore, an actuating rod connected to said slide valve and extending through the means closing one end of said bore, an annular channel in the outer face of said slide valve, said annular channel being adapted to form a conduit between longitudinally spaced ports communicating with the bore of said body portion, and a plurality of ports in circumferential alinement in said slide valve.

3. A balanced valve assembly for use in liquid pressure systems, comprising a body portion, an axial bore in said body portion, means for effectively closing one end of said bore, means for admitting pressure fluid to the open end of said bore, four annular channels formed in said body portion substantially surrounding said bore and spaced longitudinally thereof, ports leading from each of said annular channels to said bore, discharge ports leading from two of said annular channels to a common reservoir for fluid, separate ports leading from the other two of said annular channels to opposed ends of a pressure cylinder, and a cylindrical slide valve in said bore adapted to selectively admit pressure fluid into either of said last named ports and simultaneously connect the other of said last named ports with a discharge port.

4. A balanced valve assembly for use in liquid pressure systems, comprising a body portion, an axial bore in said body portion, means for effectively closing one end of said bore, four annular channels formed in said body portion substantially surrounding said bore and spaced longitudinally thereof, ports leading from each of said annular channels to said bore, discharge ports leading from two of said annular channels to a common reservoir for fluid, separate ports leading from the other two of said annular channels to opposed ends of a pressure cylinder, means for admitting pressure fluid to the open end of said bore, separate pipe means for admittting fluid under hydrostatic head into the open end of said bore, a check valve positioned in said separate pipe means, and a cylindrical slide valve in said bore provided with an annular channel in the outer face thereof adapted to selectively admit fluid pressure into either of said last named ports and simultaneously connect the other of said last named ports with a discharge port.

5. A balanced valve assembly for use in liquid pressure systems, comprising a body portion, an axial bore in said body portion, means for effectively closing one end of said bore, four annular channels formed in said body portion substantially surrounding said bore and spaced longitudinally thereof, ports leading from each of said annular channels to said bore, discharge ports leading from two of said annular channels to a common reservoir for fluid, separate ports leading from the other two of said annular channels to opposed ends of a pressure cylinder, means for admitting pressure fluid to the open end of said bore, separate pipe means for admitting fluid under hydrostatic head into the open end of said bore, a check valve in said separate pipe means, a cylindrical slide valve slidably positioned in said bore, a ported spider carried by said valve, an actuating rod connected to said spider, and an annular channel in the outer face of said slide valve, said annular channel being adapted to form a conduit between longitudinally spaced ports communicating with the bore of said body portion to selectively admit pressure fluid into either of said last named ports, and simultaneously connect the other of said last named ports with a discharge port.

6. A balanced valve assembly for use in liquid pressure systems, comprising a body portion, an axial bore in said body portion, means for effectively closing one end of said bore, four annular channels formed in said body portion substantially surrounding said bore and spaced longitudinally thereof, ports leading from each of said annular channels to said bore, discharge ports leading from two of said annular channels to a common reservoir for fluid, separate ports leading from the other two of said annular channels to opposed ends of a pressure cylinder, pipe means for admitting fluid under gravity head into the open end of said bore, a check valve positioned in said pipe means, means for admitting pressure fluid to the open end of said bore, said means communicating with said bore at a point between said check valve and valve body portion, a cylindrical slide valve slidably positioned in said bore, a ported spider carried by said valve, an actuating rod connected to said spider and extending from said body portion, an annular channel in the outer face of said slide valve, said annular channel being adapted to form a conduit between longitudinally spaced ports communicating with the bore of said body portion, a plurality of ports in circumferential alinement in said slide valve, said annular channel and ports in said slide valve being longitudinally spaced from each other along said slide valve whereby said channel and ports can simultaneously communicate with an end channel and a channel once removed therefrom in said body portion, said slide valve being adapted to by-pass pressure fluid into a discharge port while sealing off the cylinder ports when in neutral position.

Signed at Los Angeles, California, this 24th day of January 1930.

FRANK Y. PEARNE.
WILLIAM McCLINTOCK.